United States Patent
Gordon et al.

(10) Patent No.: US 10,552,183 B2
(45) Date of Patent: Feb. 4, 2020

(54) TAILORING USER INTERFACE PRESENTATIONS BASED ON USER STATE

(71) Applicant: Microsoft Technology Licensing, LLC, Redmond, WA (US)

(72) Inventors: John C. Gordon, Newcastle, WA (US); Khuram Shahid, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 15/167,667

(22) Filed: May 27, 2016

(65) Prior Publication Data
US 2017/0344209 A1 Nov. 30, 2017

(51) Int. Cl.
| | |
|---|---|
| *G06F 3/048* | (2013.01) |
| *G06F 9/451* | (2018.01) |
| *G06N 20/00* | (2019.01) |
| *G06F 3/01* | (2006.01) |
| *G06F 3/0484* | (2013.01) |
| *G06F 17/21* | (2006.01) |
| *G06F 17/22* | (2006.01) |

(52) U.S. Cl.
CPC .............. *G06F 9/453* (2018.02); *G06F 3/013* (2013.01); *G06F 3/015* (2013.01); *G06F 3/0484* (2013.01); *G06F 3/04842* (2013.01); *G06F 17/211* (2013.01); *G06F 17/2288* (2013.01); *G06N 20/00* (2019.01)

(58) Field of Classification Search
CPC ...... G06F 3/048; G06F 17/3053; G06F 3/013; G06F 3/017; G06F 3/015; G06F 17/211; G06F 17/212
See application file for complete search history.

(56) References Cited

U.S. PATENT DOCUMENTS 6,625,485 B2 9/2003 Levendowski et al.
8,483,815 B2 7/2013 Liley
(Continued)

FOREIGN PATENT DOCUMENTS

CN 204332025 5/2015
WO 2011013117 2/2011
(Continued)

OTHER PUBLICATIONS

Baldauf, et al: "A survey on context-aware systems", International Journal of Ad Hoc and Ubiquitous Computing, Inderscience Publishers, vol. 2, No. 4, published Jan. 1, 2007, pp. 263-277.
(Continued)

*Primary Examiner* — Phuong H Nguyen
(74) *Attorney, Agent, or Firm* — Workman Nydegger (57) ABSTRACT

Computer systems, methods, and storage media for tailoring a user interface to a user according to a determined user state and a determined interface context corresponding to the determined user state. The user interface is tailored by modifying the format of at least a portion of the interface, including modifying the content, layout of the content, presentation sequence, or visual display of the interface. A user interface includes a selectable formatting object for controlling the formatting of the user interface and for generating feedback data for training an ensemble learning component to enable more effective predictive formatting changes.

17 Claims, 7 Drawing Sheets

(56) References Cited

U.S. PATENT DOCUMENTS

| | | |
|---|---|---|
| 8,655,428 B2 | 2/2014 | Pradeep et al. |
| 8,699,767 B1 | 4/2014 | Khosla et al. |
| 8,758,018 B2 | 6/2014 | Peot et al. |
| 8,947,322 B1 | 2/2015 | Meng-Suen |
| 9,097,891 B2 | 8/2015 | Border et al. |
| 2004/0073129 A1 | 4/2004 | Caldwell et al. |
| 2009/0143695 A1 | 6/2009 | Mullen et al. |
| 2011/0295392 A1* | 12/2011 | Cunnington ........... G06Q 10/10 700/90 |
| 2012/0072289 A1 | 3/2012 | Pradeep et al. |
| 2012/0083668 A1 | 4/2012 | Pradeep et al. |
| 2012/0284332 A1 | 11/2012 | Pradeep et al. |
| 2013/0321270 A1 | 12/2013 | Bjorklund et al. |
| 2014/0139551 A1 | 5/2014 | McCulloch et al. |
| 2014/0282016 A1* | 9/2014 | Hosier, Jr. ................ H04W 4/08 715/733 |
| 2014/0282061 A1* | 9/2014 | Wheatley ............. H04N 21/431 715/745 |
| 2014/0300532 A1 | 10/2014 | Karkkainen et al. |
| 2015/0062052 A1* | 3/2015 | Bernstein ............. G06F 3/0416 345/173 |
| 2015/0128234 A1* | 5/2015 | Xavier ................ H04L 63/0869 726/6 |
| 2016/0109851 A1 | 4/2016 | Tsang |
| 2017/0193544 A1* | 7/2017 | Glasgow ............ G06Q 30/0242 |

FOREIGN PATENT DOCUMENTS

| | | |
|---|---|---|
| WO | 2014085910 | 6/2014 |
| WO | 2015027079 | 2/2015 |

OTHER PUBLICATIONS

Poellabauer: "Context Awareness", Published Sep. 20, 2009, pp. 1-8, available at <<http://www3.nd.edu/~cpoellab/teaching/cse40827/lecture9.pdf [retrieved on Jul. 11, 2017].

"International Search Report and the Written Opinion" issued in PCT Application No. PCT/US2017/032779 dated Aug. 28, 2017.

Heisig, et al., "Augmented Human: Human OS for Improved Mental Function", In Proceedings of Workshops at the Twenty-Eighth AAAI Conference on Artificial Intelligence, Jul. 27, 2014, pp. 20-23.

Logemann, et al., "The Effectiveness of EEG-Feedback on Attention, Impulsivity and EEG: A Sham Feedback Controlled Study", In Journal of Neuroscience Letters, vol. 479, Issue 1, Jul. 19, 2010, 1 pages.

Millan et al., "Combining brain-computer interfaces and assistive technologies: state-of-the-art and challenges", Frontiers in Neuroscience, Sep. 7, 2010, vol. 4, Article 161.

Nijholt et al., "Brain-Computer Interfaces for HCI and Games", CHI 2008 Proceedings—Workshops, Apr. 5-10, 2008, pp. 3925-3928.

* cited by examiner

TAILORING USER INTERFACE PRESENTATIONS BASED ON USER STATE

BACKGROUND

Some computer application user interfaces include various presentation formats with differences relating to the display of content, text size, text style, color schemes, background and foreground effects, sequence of content display or events, window arrangements, menu arrangements, menu complexity, content information density, animation/visualization play speed, and other interface formatting aspects.

A user interacting with an application through an application user interface may lack sufficient comprehension of the information presented through the interface, or may become confused, frustrated, bored, or distracted while interacting with the interface. This negative user experience can be a result (at least partially) of formatting of the user interface at or near the time user comprehension fails, or at or near the time the user becomes confused, frustrated, bored, or distracted.

The subject matter claimed herein is not limited to embodiments that solve any disadvantages or that operate only in environments described above. Rather, this background is only provided to illustrate exemplary technology areas where some embodiments described herein may be practiced.

BRIEF SUMMARY

The present disclosure relates to computer systems, methods, and computer storage media configured for tailoring a user interface to a user according to a determined user state and a determined interface context corresponding to the determined user state. In some embodiments, a format of an application user interface is modified in response to detecting that a user state value, with respect to a determined user interface context, exceeds a predetermined threshold value. Certain embodiments include detecting a plurality of available interface presentation formats for a particular application, each configured to display content in a different format and/or sequence, and based on the determination that the user state exceeds the predetermined threshold with respect to the detected interface context, modifying the existing format of the interface.

In some embodiments, a determined user state relates to one or more of user comprehension levels, user confusion, user frustration, user distraction, user eye strain, user boredom, and the like. In certain embodiments, a determined interface context relates to an area, container, or other aspect(s) of an interface where a user's focus is directed at the time in which the user state of confusion, distraction, frustration or other negative experience attribute exceeds a predetermined threshold. In some embodiments, a detected interface context relates to the one or more aspects of the interface causing and/or corresponding to the detected exceedance of a user state value.

In some embodiments, an operating system of a computer system running a particular application is configured to send format modification commands to the particular application to control the format display presentation of the application user interface according to determined user state values and corresponding interface contexts. In some embodiments, a computer system is configured to send user state and/or interface context information to a particular application to enable the particular application to adjust formatting accordingly, such as according to one or more predetermined user state threshold values as determined by the particular application.

Certain embodiments disclosed herein are operable to present a user interface having one or more user selectable formatting objects, which are configured to selectably and dynamically change the format, content, and/or display sequence of the interface upon user selection and a determined user state at the time of user selection of the selectable formatting object(s). Embodiments of selectable formatting objects include proactive-type "toggle" objects which are operable (when selected) to initiate a format change to the interface, and reactive-type "go back" objects which are operable (when selected) to undo or prevent a suggested automatic interface formatting change. In some embodiments, selection of the one or more selectable formatting objects results in the generation of one or more feedback data structures which are operable to enable training of computer system components so as to provide more effective predictive formatting modifications in the future, based on the feedback data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The present disclosure relates to computer systems, methods, and computer storage media configured for tailoring the format of a user interface to a user according to a determined state of the user and according to a determined user interface context. Various technical effects and benefits may be achieved by implementing aspects of the disclosed embodiments. For example, at least some disclosed embodiments are operable to facilitate efficient configuration of user interfaces to enable improved customization and more effective personalization of data using the interfaces, as disclosed herein. This can be particularly beneficial for applications having multiple presentation formats. The detection of a particular user state within a particular user interface context, and the modifying of the user interface based on the detected user state and corresponding user interface context can also facilitate enhanced utilization of an application's functionality.

In addition, some embodiments are operable to enable tailored user interface format presentations that provide one or more of enhanced user comprehension and enjoyment, while minimizing user confusion, frustration, distraction, and/or eye strain, for example. In one example, an application providing a user interface with a particular presentation format may be difficult to comprehend for some users, or may have one or more particular aspects that a user has a more difficult time properly interacting with or understanding. A user of a prior computer system would typically be left in a state of confusion and/or frustration while he or she either continued to struggle through the problem, became distracted, or simply gave up. A user of such a prior computer system would typically at least be forced to seek out additional user instructions, help menus, and the like, costing more time and/or computational resources than would otherwise be necessary.

In contrast, embodiments disclosed herein are operable to provide tailored user interface displays that function to optimize formatting parameters to provide enhanced user convenience, increased ease of navigation, while minimizing user confusion, frustration, potential distraction, and/or time and computational resource-wasting activities. Such embodiments can be used to provide increased user convenience and computational efficiencies over existing systems, such as, for example, by requiring less computation time and navigation steps by the computer as the user navigates the displayed content.

Figure 1:
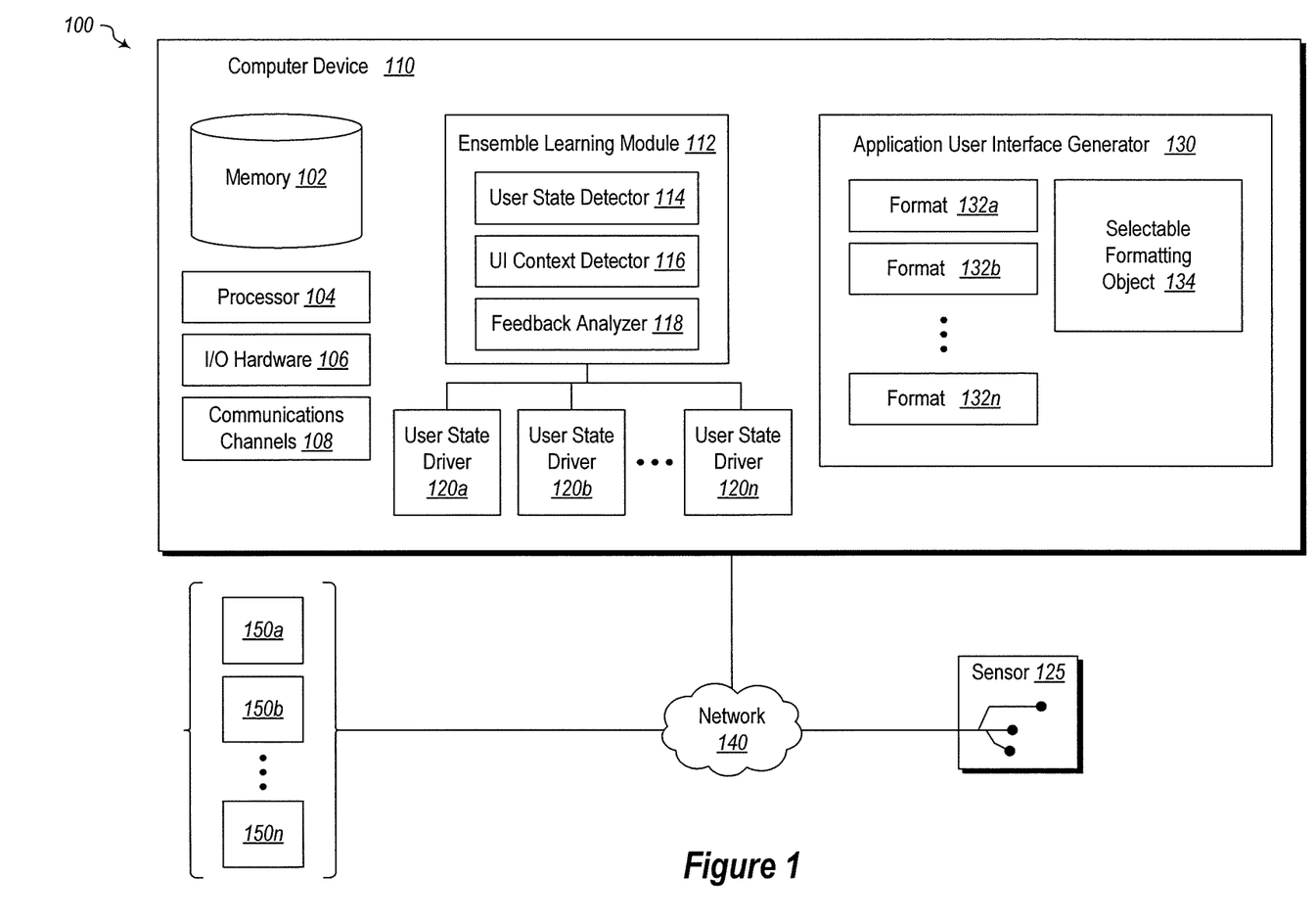
FIG. 1 illustrates a computer system configured for tailoring a user interface according to a determined user state.

FIG. 1 illustrates an exemplary computer system 100 configured for tailoring a user interface based on a detected user state and detected user interface context corresponding to user focus at the time of the detected user state. As shown, the illustrated computer system 100 includes a computer device 110 with a memory 102 and at least one processor 104. Alternative embodiments may include a plurality of processors and/or memory storage devices. The memory 102 may be physical system memory, which may be volatile, non-volatile, or some combination of the two. The term "memory" may also be used herein to refer to non-volatile mass storage such as physical storage media.

The computer device 110 optionally includes input/output hardware 106, including one or more keyboards, mouse controls, touch screens, microphones, speakers, display screens, track balls, scroll wheels, biometric sensors (e.g., electroencephalography sensors (EEG), heart rate monitors, eye tracking devices, user temperature sensors), and the like to enable the receiving of information from a user and for displaying or otherwise communicating information to a user.

The illustrated computer device 110 also includes an application user interface generator (UI generator 130) capable of operation on the computer system 100 to control the display of the user interface of a particular application. As shown, the UI generator 130 includes a number of different user interface formats 132a through 132n (referred to generically as format(s) 132).

In some embodiments, each of the formats 132 is associated with one or more aspects and/or one or more interface containers (e.g., separate regions or windows) of the user interface generated by the UI generator 130. For example, a particular format 132 may be associated with a text display aspect (e.g., font style), a menu arrangement, color scheme, background/foreground effect, window/tile organization, content imaging style (e.g., video or animation vs. still image), language type, vocabulary level, content degree of completeness (full version vs. summarized version), display setting (e.g., brightness, contrast), scrolling speed, play speed, refresh rate, audio effect, etc. Some formats may be associated with one or more aspects of a user interface within a relatively smaller subset of different user interface aspects. Other formats may be associated with a set of user interface aspects so as to form a theme of interrelated user interface aspects.

Some of the formats 132 are associated with static user interface components, such as menu displays and arrangements, display settings, and the like, while other formats are associated with dynamic user interface aspects, such as play speeds and the like. Some embodiments described herein are operable to modify a user interface format 132 according to one or more static or dynamic user interface formats.

The application associated with the UI generator 130 may be a word processor, a video game, a virtual reality or mixed reality simulator, an audiovisual service, a slideshow presentation application, a web browser, a spreadsheet application, a file or database manager, or any other application having a plurality of different presentation formats. Although a single application UI generator 130 is shown in this embodiment, it will be understood that a plurality of different applications and corresponding user interface generators may also be included with and/or added to the computer system 100.

The computer device 110 also includes executable modules or executable components 112-120, described in more detail below. As used herein, the term "executable module" or "executable component" can refer to software objects, routines, or methods that may be executed on the computing system. The different components, modules, engines, and services described herein may be implemented as objects or processes that execute on the computing system.

The illustrated computer device 110 includes communication channels 108 that enable the computer device 110 to communicate with one or more separate computer systems. For example, the computer system 100 may be a part of network 140, which may be configured as a Local Area Network ("LAN"), a Wide Area Network ("WAN"), or the Internet, for example. In some embodiments, the computer device 110 communicates with and/or is part of a distributed computer environment 150, as indicated by the plurality of separate computer systems 150a through 150n, each of which may contain one or more of the disclosed components that are shown in system 100, entirely or partially, such as one or more of the memory components, application components, or any of the other components.

The various components illustrated in FIG. 1 represent only a few example implementations of a computer system configured for tailoring a user interface according to a detected user state and a detected user interface context temporally associated with the detected user state. Other embodiments may divide the described memory/storage, modules, components, and/or functions differently among additional computer systems. For example, in some embodiments the ensemble learning module 112 and/or the user state drivers 120a-120n are included in different computer systems and/or locations, whereas in other embodiments they are included in the same standalone computer system, as illustrated.

In some embodiments, memory components and/or program modules are distributed across a plurality of constituent computer systems (e.g., 150a-n) in a distributed environment. In other embodiments, memory components and program modules are included in a single integrated computer system. Accordingly, the systems and methods described herein are not intended to be limited based on the particular location at which the described components are located and/or at which their functions are performed.

The illustrated computer device 110 includes an ensemble learning module 112 configured to receive data related to a user state from one or more user state drivers 120a to 120n (referred to generically as user state driver(s) 120), and to determine a user state based on the user state data received from the one or more user state drivers 120. The ensemble learning module 112 is also configured to determine a user interface context corresponding at least temporally to a determined user state, and based on the determined user state and user interface context, to generate user interface formatting information and/or formatting commands for communication with the application user interface 130.

The one or more user state drivers 120 are configured to generate user state data for communication to the ensemble learning module 112. The one or more user state drivers 120 detect user state data based on biometric data (e.g., EEG data, heart rate tracking, user temperature readings, perspiration measurements, respiration rate recording, etc.) or other physiological conditions of the user, event tracking (e.g., mouse pointer activity, navigation history, menu selection tracking, etc.), gesture detection (e.g., movement of a user body part and/or peripheral device), and/or user profile information (e.g., history of confusion under similar circumstances, age, education, experience with the particular application, etc.).

In some embodiments, one or more user state drivers 120 are provided and/or managed by one or more third party services. The drivers 120 may also be connected to one or more sensor(s) 125 that are part of the computing system 100 and/or part of one or more distributed system(s) 125. The sensors 125 and/or drivers 120 are operable to detect user state data that is operable, when detected, to trigger a selection of a format from a plurality of formats for an interface that is presenting data to a user.

As shown, the ensemble learning module 112 includes a user state detector 114 configured to receive the user state data from the one or more user state drivers 120 and/or sensors 125 in order to process and determine the user state. In some embodiments, the user state detector 114 is configured to determine the user state in the form of a relative numeric score/value along one or more user state scales (e.g., comprehension, frustration, distraction, etc.).

In some embodiments, the user state detector 114 is operable to assign weights to the user state data received from the one or more user state drivers 120 to enable the generation of an overall user state value according to the one or more weighted values. As explained in more detail below, in some embodiments, the ensemble learning module 112 is configured to receive training data to enable the setting and/or adjusting of the respective weightings of the user state data received from different user state drivers 120 and/or sensors 125.

As shown, the ensemble learning module 112 also includes a user interface context detector 116 configured to determine the user interface context associated with the detected user state. In some embodiments, the user interface context indicates an aspect of the user interface corresponding to an area of user focus at the time at which the user state is detected (e.g., at the time at which a user state value surpasses or falls below a predetermined threshold). For example, if a user may be attempting to navigate through a particular set of menu elements at the time at which a detected level of comprehension drops below a predetermined threshold. In such a situation, the particular set of menu elements is determined as the user interface context corresponding to the determined user state.

In some embodiments, the user interface context is determined using eye tracking. In such embodiments, the UI context detector 116 is operable to receive eye tracking data from one or more sensors 125 and the state drivers 120 to determine an aspect of the user interface corresponding to the detected user state based on the measured eye movement pattern of the user. For example, the UI context detector 116 may be operable to determine the user interface context based on a particular gaze area, rate of eye movement between different areas of the user interface, duration of gaze upon a particular area (e.g., potentially indicating lack of comprehension of that area), number and/or duration of times the user looks away from the interface (e.g., potentially indicating distraction and/or boredom).

Additionally, or alternatively, the UI context detector 116 may be configured to determine the user interface context according to one or more of a currently active window, the rate or pattern of switching between different windows or switching between other aspects of the user interface (e.g., tabs, location within a playlist, etc.), cursor movement, pattern of interface object selection, currently selected interface object(s), window display arrangement, or other user interface parameter indicating an aspect of the user interface to which the user's attention is directed, at least in part. In some embodiments, the UI context detector 116 functions in conjunction with one or more components of the application to determine the interface context. In some embodiments, the an interface context is determined by the application.

Additionally, or alternatively, the UI context detector 116 may be configured to determine the user interface context according to a position of a cursor or other pointing object connected to the computing system.

In some embodiments, the ensemble learning module 112 is operable to send formatting information to the application associated with the application user interface generator 130 to enable the application to determine an appropriate formatting response. For example, the ensemble learning module 112 may communicate data related to a determined user state in the form of a numeric score, along with a corresponding user interface context. The application is then enabled to select and/or modify one or more formats 132 according to the received user state and user interface context data. In some embodiments, for example, the application switches or modifies a format 132 based on one or more predetermined threshold values. By way of example, the application may only modify formatting of the user interface upon receiving a particular user state score, for a particular user interface context, that surpasses a predetermined threshold value.

In alternative embodiments, the ensemble learning module 112 is operable to send formatting commands to the application associated with the application user interface generator 130 to enable the application to perform a determined formatting response. For example, the ensemble learning module 112 may be configured to determine the appropriate format modification according to the determined user state and corresponding user interface context, and to control the application user interface 130 by sending formatting instructions to modify the format 132 of the interface 130. As with some of the application directed formatting embodiments, some of the operating system directed embodiments generate formatting modification instructions based on one or more predetermined user state threshold values.

In some embodiments, threshold values differ according to different user state scales (e.g., comprehension, frustration, distraction, etc.) and/or user state contexts. For example, a threshold value for a particular format modification may differ according to a particular user state scale (e.g., may be lower for "frustration" than for "distraction"), and a threshold value for a particular user interface context may differ from a threshold value for another user interface context (e.g., may be lower for a menu arrangement context than for a text size display).

In the illustrated embodiment, the application user interface 130 also includes a selectable formatting object 134 configured to generate a user interface object for providing user-selectable control over display of the different formats 132. The ensemble learning module 112 also includes a feedback analyzer 118 configured to receive formatting feedback data from at least the application user interface 130 indicating at least formatting information associated with user selection of the selectable formatting object 134. The feedback analyzer 118 is operable to reconfigure one or more components of the ensemble learning module 112 based on the received feedback data to enable training and improved performance of the ensemble learning module 112.

In some embodiments, the feedback analyzer 118 is operable to adjust one or more user state threshold values to align functionality of the user state detector 114 to user preferences according to feedback data generated through a user's selection of the selectable formatting object 134. In some embodiments, the feedback analyzer 118 is operable to adjust one or more parameters of the UI context detector 116 to align the determination of user interface context to feedback data received by the feedback analyzer 118.

In some embodiments, the selectable formatting object 134 is represented as one or more user-selectable buttons or other interface object(s) that allow a user to toggle between the different formats 132 available for a particular application user interface 130. In some embodiments, upon selection, the selectable formatting object 134 is operable to toggle the available formats 132 through a predetermined cycle, to randomly select and present a new format 132, or to use the user state and user interface context data to present a best estimate for a desired format 132.

In a best estimate implementation, for example, the selectable formatting object 134 is operable, upon selection, to prompt the ensemble learning module 112 to determine a current user state and corresponding user interface context to enable an appropriate formatting modification. For example, in circumstances where no user state threshold values have been surpassed so as to trigger an automatic formatting modification, user selection of the selectable formatting object 134 can cause the ensemble learning module 112 to determine a user state based on one or more threshold values that are the closest to being exceeded, and to generate corresponding format modification information or commands. In addition, in some embodiments, the feedback analyzer 118 is operable to update the relevant threshold values to enable better predictive interface formatting functionality in the future.

In some embodiments, the selectable formatting object 134 includes a "go back" option, or similarly phrased option, such that selection of the selectable formatting object 134 (or another selectable object) is operable to cause the application user interface 130 to revert back to the format previous to selection of the formatting object 134. For example, in circumstances where an automatic format modification has been provided, but where a user prefers the previous format, as indicated by selection of the go back component of the formatting object 134, the feedback analyzer 118 is operable to adjust one or more user state threshold values and/or other parameters of the ensemble learning module 112 to avoid overly sensitive triggering of the format change in the future.

In some embodiments, user state data, user interface context data, and/or feedback data generated from other computer devices and systems (e.g., components/devices 150) are provided to the computer device 110 through network 140. Such data may be used by the ensemble learning module 112 to provide initial/default user state threshold values, to make adjustments to threshold values based on feedback data associated with similar users and/or similar application interfaces, and/or to provide a basis for initial formatting information or commands that may be adjusted as training and customization provided by the feedback analyzer 118 progresses.

In the description that follows, embodiments are described with reference to acts that are performed by one or more computing systems. If such acts are implemented in software, one or more processors of the associated computing system that performs the act direct the operation of the computing system in response to the processor(s) of the computing system having executed computer-executable instructions that are embodied on one or more computer-readable media (e.g., hardware storage device(s)). An example of such an operation involves the manipulation of data.

The computer-executable instructions (and the manipulated data) may be stored in the memory 102 of the computer system 100, and/or in one or more separate computer system components. The computer-executable instructions may be used to implement and/or instantiate all of the functionality disclosed herein, including the functionality that is disclosed in reference to one or more of the flow diagrams of FIGS. 2 through 4. The following description of the computer-implemented methods illustrated by FIGS. 2 through 4 include example applications and computer systems. One of skill in the art will understand that the particular methods are not limited to the particular examples used. Likewise, one of skill in the art will understand that a particular example application or computer system need not be confined to the particular embodiment in which it is described, but may be utilized in whole or in part in one or more of the other embodiments described herein.

Figure 2:
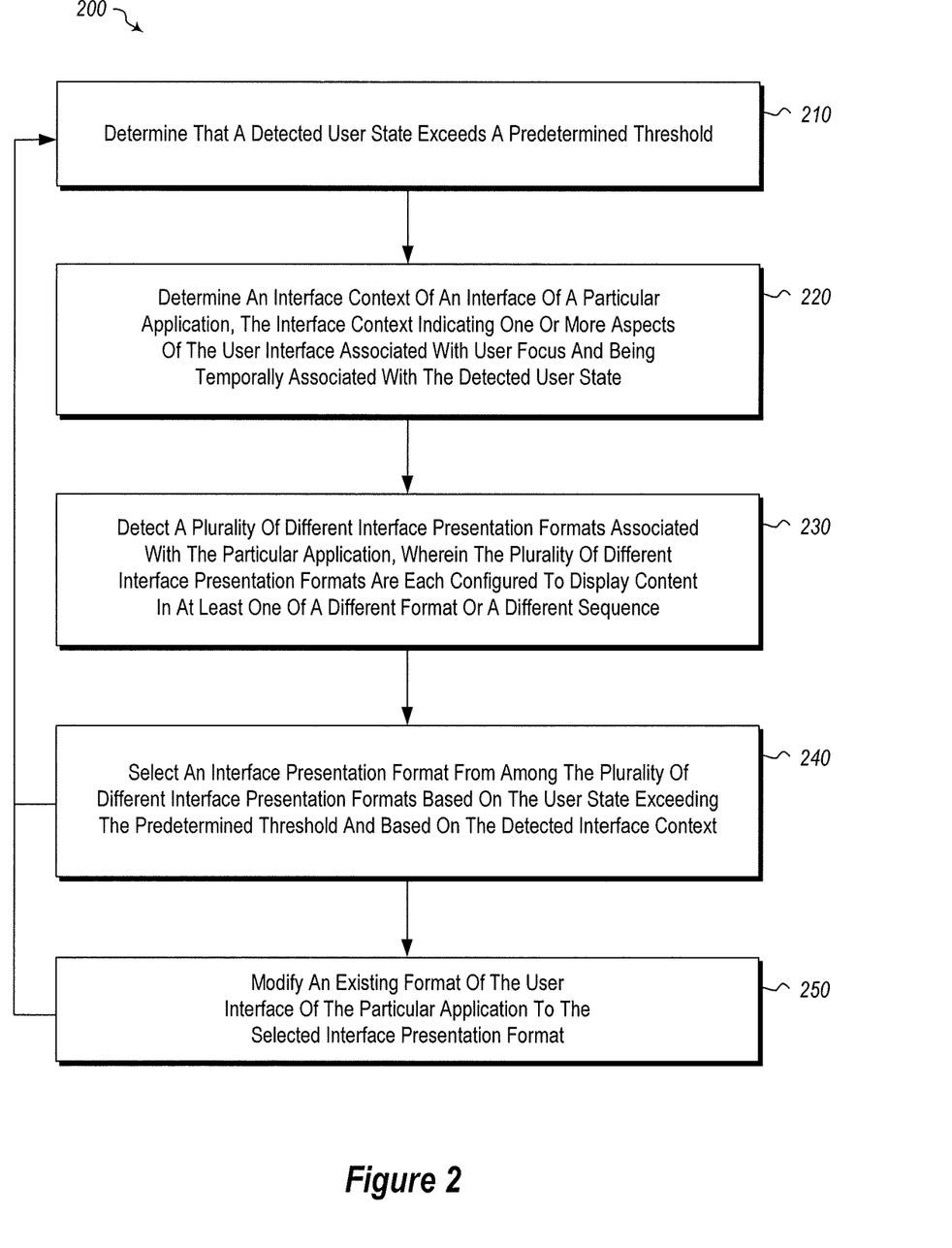
FIG. 2 illustrates a flowchart of an exemplary method for tailoring a user interface according to a determined user state, where the computer system is configured to generate formatting commands for controlling an application interface.

FIG. 2 is a flowchart 200 of a computer-implemented method for tailoring the format of a user interface to a user according to a determined state of the user. As shown, a computer system operates to determine that a detected user state exceeds a predetermined threshold (act 210). In some embodiments, one or more thresholds are configured as ceiling values, and the user state is determined as exceeding the predetermined threshold by rising above the threshold value, such as when a confusion, distraction, or frustration level exceeds the threshold. Additionally, or alternatively, one or more thresholds are configured as floor values, and the user state is determined as exceeding the predetermined threshold by falling below the threshold value, such as when a comprehension or attention level falls below the threshold.

The computer system also determines an interface context of an interface of a particular application, the interface context indicating one or more aspects of the user interface associated with user focus and being temporally associated with the detected user state (act 220). In some embodiments, the determined user interface context is determined by tracking a user's eyes to determine an area or aspect of the user interface that the user is focused on at the time the user state is detected (e.g., at the time the user state is detected as exceeding the predetermined threshold). Additionally, or alternatively, the interface context may be determined by detecting, at the time of the detected user state, one or more of cursor position, the active window, the element(s) selected, the most recent selection/event, the window arrangement, the history of actions/events, or other indicators for showing the one or more aspects of the interface causing or otherwise corresponding to the detected user state.

The computer system also detects a plurality of different interface presentation formats associated with the particular application, wherein the plurality of different interface presentation formats are each configured to display content in at least one of a different format or a different sequence (act 230). By way of example, an educational quiz application may have a number of different presentation formats for displaying a set of questions, for receiving answers as input from a user, for displaying answers, and/or for offering review and follow up with respect to the concepts tested. The different formats may present the learning concepts in different sequences and/or may intersperse breaks and review questions/activities at different frequencies. In addition, the different formats may present different interface elements, (e.g., textual elements, menu elements, data indicators, progress bars, color schemes, background/foreground elements, other text or image content, etc.) according to different styles, sizes, colors, or other settings.

The computer system subsequently selects an interface presentation format from among the plurality of different interface presentation formats based on the user state exceeding the predetermined threshold and based on the detected interface context (act 240). For example, upon detecting that a user is becoming overly distracted or bored with respect to the displayed learning content, the computer system can direct the educational quiz application to select a format with increased focus on the learning content (e.g., greater text size, bolder text, higher contrast, less information density per slide, more graphical displays, more animations, etc.), a format that increases the rate of breaks and review activities to increase the amount of required user interaction with the interface, and/or a format that adjusts the sequence of the learning content. In some embodiments, the computer system subsequently modifies an existing format of the user interface of the particular application to the selected interface presentation format (act 250).

In some embodiments, the computer-implemented method illustrated in FIG. 2 utilizes an operating system of the computer system to generate formatting commands which are operable to control the format modification of the particular application.

In some embodiments, the various acts illustrated in FIG. 2 (and the other Figures) are implemented iteratively and recursively as new state data is obtained from the various drivers/sensors, thereby resulting in numerous format changes during one or more user sessions.

Figure 3:
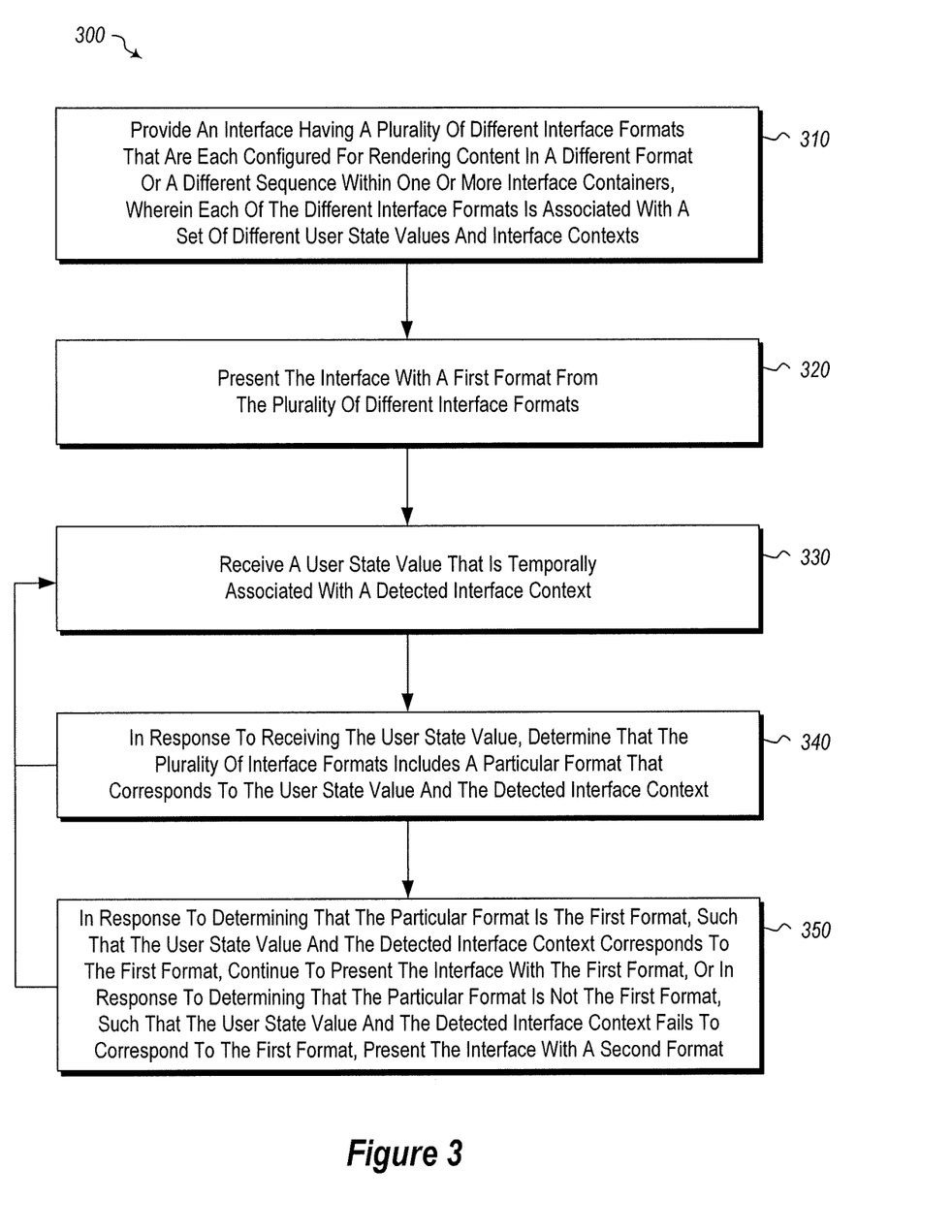
FIG. 3 illustrates a flowchart of an exemplary method for tailoring a user interface according to a determined user state, where a computer system is configured to receive user state and interface context data to enable interface format modifications.

FIG. 3 also illustrates a flowchart 300 of a computer-implemented method for tailoring the format of a user interface to a user according to a determined state of the user. Some embodiments of the method illustrated in FIG. 3 may utilize user state data and interface context data to enable an application to perform one or more format modifications according to predetermined thresholds or other settings of the application.

As shown in FIG. 3, a computer system provides an interface having a plurality of different interface formats that are each configured for rendering content in a different format or a different sequence within one or more interface containers, wherein each of the different interface formats is associated with a set of different user state values and interface contexts (act 310). For example, for a particular interface context, such as a menu ribbon, a related set of different interface formats may include formats that progressively trend from relatively more complex to relatively more simplified, with formats of higher complexity being associated with higher user state comprehension values.

The computer system presents the interface with a first format from the plurality of different interface formats (act 320), and receives a user state value that is temporally associated with a detected interface context (act 330). For example, the computer system may receive a user state value indicating that a user comprehension value temporally associated with the interface context of the menu ribbon has fallen below a predetermined threshold value corresponding to the first format.

In response to receiving the user state value, the computer system determines that the plurality of interface formats includes a particular format that corresponds to the user state value and the detected interface context (act 340). For example, the computer system may determine that an interface format having a simplified version of the menu ribbon corresponds to the received user comprehension value.

In response to determining that the particular format is the first format, such that the user state value and the detected interface context corresponds to the first format, the computer system continues to present the interface with the first format, or in response to determining that the particular format is not the first format, such that the user state value and the detected interface context fails to correspond to the first format, the computer system presents the interface with a second format (act 350). Continuing with the menu ribbon example, because the computer system determined that the particular format corresponding to the received user comprehension value was a format with a simplified version of the menu ribbon, and not the current format with the relatively more complex menu ribbon, the computer system operates to present the interface with the simplified menu ribbon format. Alternatively, in an example where the received user comprehension value corresponding to the menu ribbon corresponds to the more complex menu ribbon format, the computer system is operable to continue to present the more complex menu ribbon format.

The foregoing example includes a user interface having different formats that progressively trend from relatively more complex to relatively more simplified versions of a particular interface context. Alternative embodiments include different formats that correspond to different versions of an application as related to one or more interface contexts. For example, as an application is updated to include new features, layouts, schemes, or other component changes that effect interface layout/formatting, some users may prefer and adapt to the newer updates, while other users may prefer at least some aspects of the previous version's interface layout/formatting.

Some embodiments therefore include formats that differ according to different application versions, and include elements that are operable to modify the interface format according to a determined user state and corresponding interface context so as to format the interface according to the version of the particular interface context that minimizes one or more of user confusion, frustration, distraction, etc. and/or that maximizes user comprehension and enjoyment.

Figure 4:
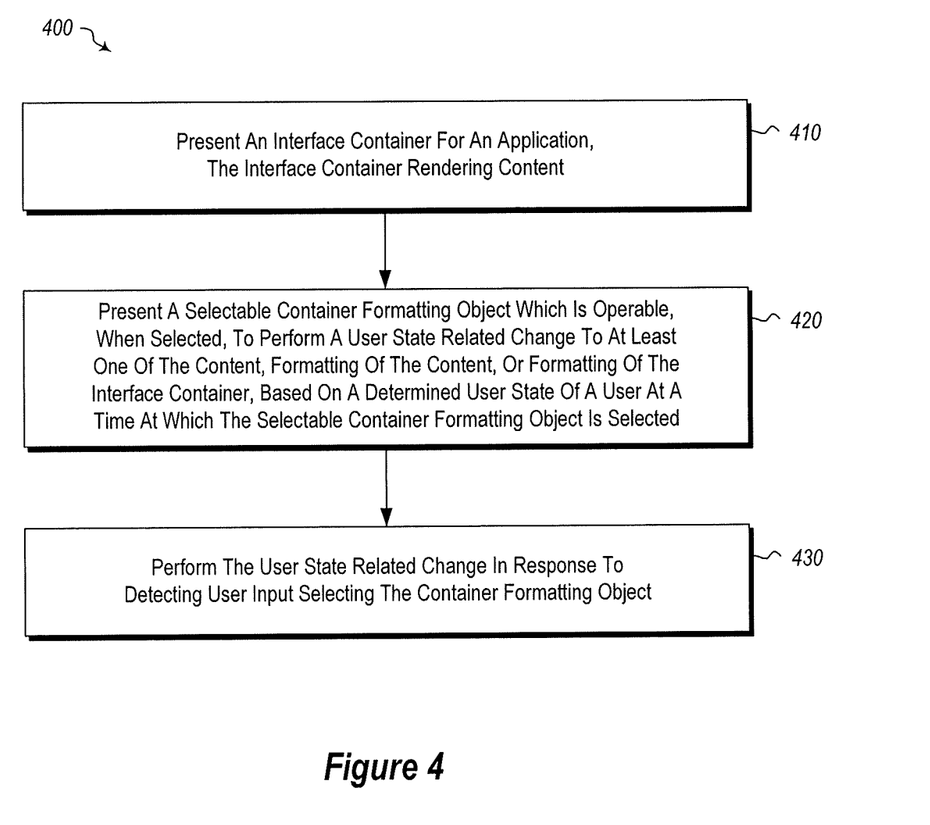
FIG. 4 illustrates a flowchart of an exemplary method for controlling user interface formatting through selection of a selectable formatting object.

FIG. 4 illustrates a flowchart 400 of a computer-implemented method for controlling the format of a user interface to a user according to a determined state of the user as associated with a selectable formatting object. As shown, a computer system presents an interface container for an application, the interface container rendering content (act 410), and presents a selectable container formatting object which is operable, when selected, to perform a user state related change to at least one of the content, formatting of the content, or formatting of the interface container, based on a determined user state of a user at a time at which the selectable container formatting object is selected (act 420).

For example, the selectable container formatting object may be presented as a button or series of buttons or other user-selectable objects presenting one or more interface formatting options such as toggle, go back, random, and the like. In some embodiments, the formatting object is continuously displayed and/or is continuously selectable. In other embodiments, the formatting object is only displayed and/or is only selectable when a particular interface formatting option is available. For example, in some embodiments, the formatting object appears (e.g., as a pop-up indicator) after or along with an automatic interface modification, indicating an option to "go back" (or similar phrase) upon selection of the formatting object.

The computer system subsequently performs the user state related change in response to detecting user input selecting the container formatting object (act 430). In some embodiments, the method further includes user state related change data corresponding to the performed user state related change to an ensemble learning module to train the ensemble learning module so as to enable automatic operation of one or more subsequent user state related changes upon subsequently detecting the determined user state. For example, user state data and/or interface context data associated with user selection of the formatting object may be utilized to provide training of the ensemble learning module so that when the same or similar user state (e.g., threshold value) and corresponding interface context are determined in the future, the ensemble learning module can be operable to automatically perform the associated formatting modification.

The following examples illustrate operation and functionality of various exemplary embodiments for tailoring a user interface according to a determined user state and corresponding interface context. The scope of the concepts and features described herein and recited in the claims is not limited to these particular illustrated examples, nor the referenced types of applications. Other embodiments include different configurations and combinations of applications and application interface formats.

Figure 5A:
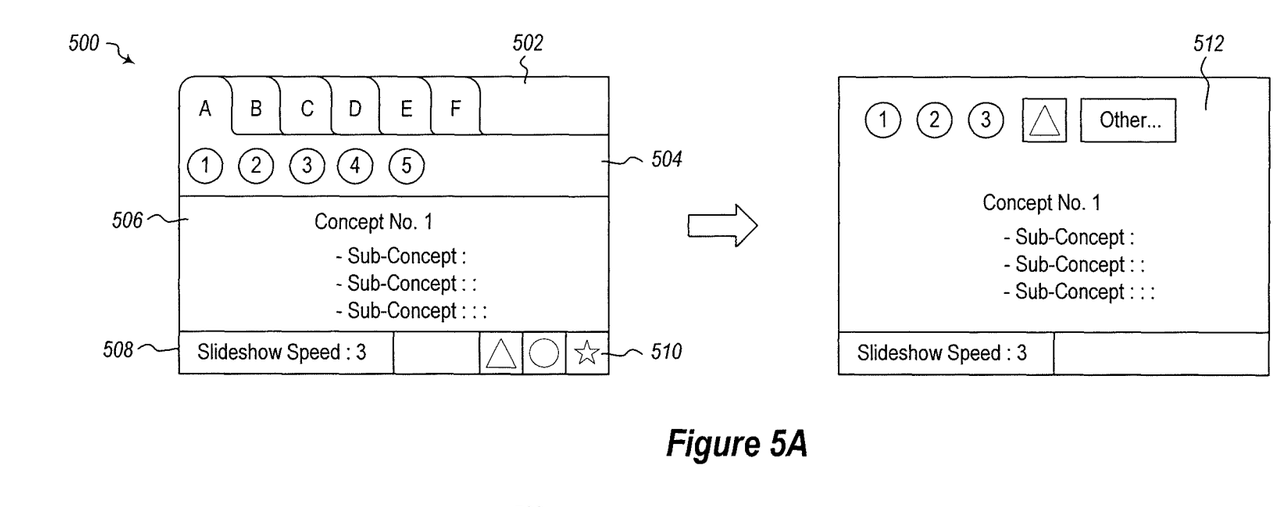
FIGS. 5A-5C illustrate exemplary embodiments of an application user interface being modified according to various different detected user states and interface contexts.
Figure 5B:
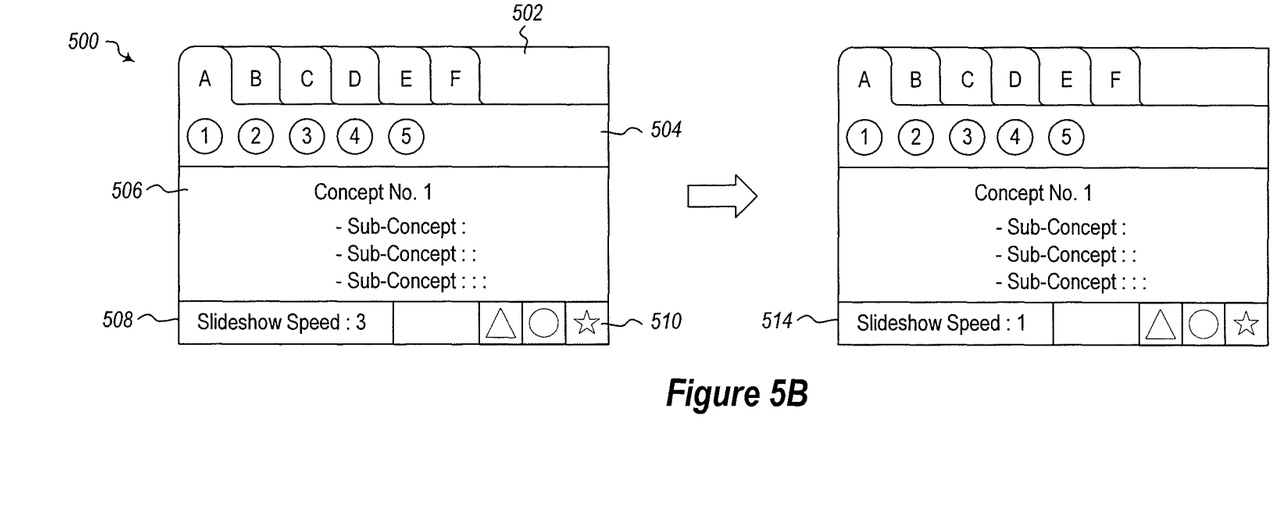
Figure 5C:
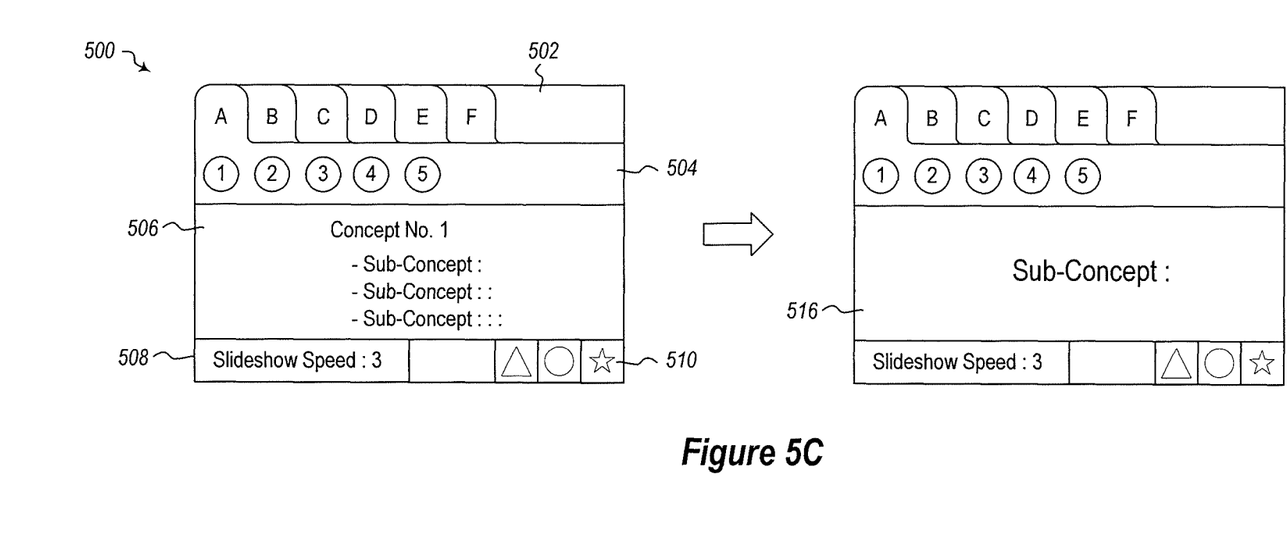

FIGS. 5A-5C illustrate an interface 500 subjected to various format modifications according to determined user states and interface contexts. FIGS. 5A-5C show an interface 500 having a menu ribbon 502 listing tabs A through F, a sub-menu ribbon 504 listing sub-menu items 1 to 5, a display area 506 for presenting information as part of a slideshow view, a slideshow speed indicator 508, and a bottom menu 510 showing additional menu objects. FIG. 5A illustrates an exemplary interface format modification. As shown, the interface 500 is transitioned from a format having a relatively more complex menu arrangement to a format having a simplified menu arrangement 512 that combines some of the objects of the ribbon 504 and the bottom menu 510 into a single, scaled down menu. By way of example, the illustrated format modification may occur as a result of the computer system determining a user state indicating confusion or frustration, in exceedance of a predetermined threshold value, with the more complex menu arrangement. In response, the computer system modifies the menu arrangement to form the simplified arrangement 512.

FIG. 5B illustrates another exemplary interface format modification. As shown, the interface 500 is transitioned from a format having a slideshow speed of 3 to a format having a slideshow speed of 1, as indicated by the modified slideshow speed indicator 514. By way of example, the illustrated format modification may occur as a result of the computer system determining a user state indicating lack of sufficient comprehension of one or more slides within the sequence of presented slides. In response, the computer system modifies the interface format to enable a slower presentation speed to give the user sufficient time to comprehend the presented information.

FIG. 5C illustrates another exemplary interface format modification. As shown, the interface 500 is transitioned from a format having a display area 506 showing a relatively more information dense display, to a format having a display area 516 having a relatively less information dense display. By way of example, the illustrated format modification may occur as a result of the computer system determining a user state indicating frustration, in exceedance of a predetermined threshold, with the amount of information in a given slide and/or difficulty reading the smaller font text. In response, the computer system modifies the interface format to enable a more granular presentation of the information with larger and more readable text.

Figure 6:
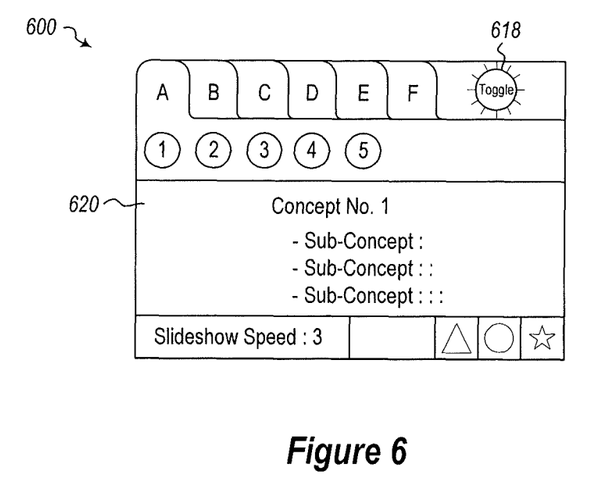
FIGS. 6 and 7 illustrate exemplary embodiments of application user interfaces including selectable formatting objects.

FIG. 6 illustrates an exemplary embodiment of a user interface 600 having an interface format 620 and including a selectable formatting object 618. In this embodiment, the selectable formatting object 618 is displayed to indicate to a user the option to "toggle" between available user interface formats upon user selection of the object 618. Alternative embodiments may include one or more differently configured user-selectable formatting objects (not presently shown) indicating an option for "next available format," "random format," and the like, which may be presented next to the toggle object 618 or on another area of the interface 600.

Figure 7:
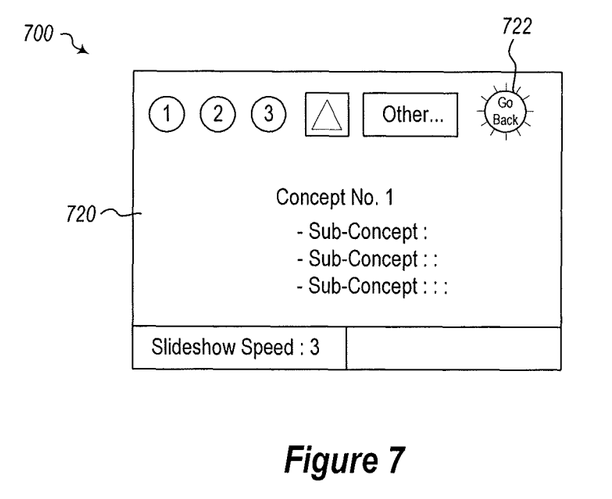

FIG. 7 illustrates an exemplary embodiment of a user interface 700 having an interface format 720 and including a selectable formatting object 722. In this embodiment, the selectable formatting object 722 is displayed to indicate to a user the option to "go back" to a previous interface format upon user selection of the object 722. For example, in some embodiments, the selectable formatting object 722 appears upon automatic transition to the interface format 720, providing a user with the option to return to the previous interface format. Alternatively, the formatting object 722 may appear with a preview window suggesting to a user the potential interface format 720.

In some embodiments, the selectable formatting objects 618 and 722, or embodiments similar thereto, are combined into a multiple-option selectable formatting object menu, which may also include one or more additional selectable formatting objects. In some embodiments, as described by the foregoing, user selection of selectable formatting objects results in the generation of one or more feedback data structures which are operable to train an ensemble learning component for effective predictive formatting functionality.

Based on the foregoing, it will be appreciated that scope of this disclosure includes both explicit and implicit selection of format type and timing for presenting the selected format types. For instance, explicit format selection and triggers include the selection of displayed objects (e.g., toggle, go back and other objects), detected gestures, activation of physical controls, and so forth. Implicit format selection and triggers include detecting and processing of state data reflecting physiological conditions of the user (e.g., EEG data and other biometric data).

The disclosed embodiments may comprise or utilize a special-purpose or general-purpose computer systems that includes computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for tailoring a format of a user interface of a particular application to a user according to a determined state of the user, the method being implemented by a computer system that includes at least one processor and one or more hardware storage device(s) having stored thereon computer-executable instructions that are executable by the at least one processor to cause the computer system to implement the method, the method comprising:
   determining a user state of the user, wherein the user state comprises a comprehension level or a confusion level regarding how the user interacts with the user interface, wherein determining the user state is performed by identifying contexts for how the user interacts with the user interface, and wherein identifying the contexts includes identifying thresholds for the contexts and computed scores of the user for the contexts;
   detecting a plurality of different interface presentation formats associated with the particular application, wherein each different interface presentation format in the plurality of different interface presentation formats is configured to display content in at least one of a different format or a different sequence than used by another different interface presentation format in the plurality of different interface presentation formats, wherein:
     a toggle button is provided on the user interface, the toggle button, when selected, causes the user interface to toggle from a current interface presentation format to a next interface presentation format from the plurality of different interface presentation formats based at least on the detected user state;
   selecting an interface presentation format from among the plurality of different interface presentation formats based on the user state; and
   in response to a selection of a particular user interface command configured to cause the user interface to revert from being displayed with the current interface presentation format to being displayed with a previous interface presentation format, adjust one or more of the identified thresholds in order to reduce a triggering sensitivity for determining when a subsequent interface presentation format change is to occur, such that the triggering sensitivity is reduced in direct response to the particular user interface command being selected.

2. The method of claim 1, further comprising modifying an existing format of the user interface of the particular application to the selected interface presentation format.

3. The method of claim 1, wherein the contexts include a user eye focus.

4. The method of claim 1, wherein the contexts include a detected cursor focus and a detected active window.

5. The method of claim 1, wherein the user state is detected based at least in part on biometric data.

6. The method of claim 1, wherein the method further includes receiving a plurality of user state related data inputs and assigning respective weights to each of the data inputs to arrive at the particular score for comparison with its corresponding threshold.

7. The method of claim 1, wherein the user state is detected based at least in part on electroencephalography data to determine the comprehension level.

8. The method of claim 1, wherein the detected user state comprises a confusion level based on electroencephalography.

9. The method of claim 1, wherein the thresholds are updated in response to feedback data.

10. A computer-implemented method for controlling a format of a user interface of a particular application to a user according to a determined state of the user, the method being implemented by a computer system that includes at least one processor and one or more hardware storage device(s) having stored thereon computer-executable instructions that are executable by the at least one processor to cause the computer system to implement the method, the method comprising:
   presenting an interface container for the particular application, the interface container rendering content;
   identifying a determined user state, wherein determining the user state is performed by identifying contexts for how the user interacts with the user interface, and wherein identifying the contexts includes identifying thresholds for the contexts and computed scores of the user for the contexts;
   presenting a selectable container formatting object which is operable, when selected, to perform a user state related change to at least one of the content, formatting of the content, or formatting of the interface container, based on the determined user state of a user at a time at which the selectable container formatting object is selected, wherein different user states correspond to different user state related changes in a set of possible user state related changes, wherein:
     the selectable container formatting object includes a toggle button provided on the user interface, the toggle button, when selected, causes the user interface to toggle from a current interface presentation format to a next interface presentation format based at least on the user state and an interface context;
   performing the user state related change in response to detecting user input selecting the container formatting object, wherein performing the user state related change comprises selecting the user state related change to be performed, from the set of possible user state related changes, in response to determining the user state related change corresponds to the determined user state that is determined to exist at the time in which the selectable container formatting object is selected; and in response to a selection of a particular user interface command configured to cause the user interface to revert from being displayed with the current interface presentation format to being displayed with a previous interface presentation format, adjust one or more of the identified thresholds in order to reduce a triggering sensitivity for determining when a subsequent interface presentation format change is to occur, such that the triggering sensitivity is reduced in direct response to the particular user interface command being selected.

11. The method of claim 10, further comprising sending user state related change data corresponding to the performed user state related change to an ensemble learning module so as to train the ensemble learning module to enable automatic operation of one or more subsequent user state related changes upon subsequently detecting the determined user state.

12. The method of claim 11, wherein training the ensemble learning module includes adjusting one or more of the thresholds, the thresholds being operable to trigger a corresponding automatic user state related change to the interface container upon determining that one of the computed scores has exceeded its corresponding threshold.

13. The method of claim 10, wherein the selectable container formatting object is only presented when one or alternative interface formats are available.

14. A computer system comprising:
one or more processor(s); and
one or more computer-readable hardware storage device(s) having stored thereon computer-executable instructions that are executable by the one or more processor(s) to cause the computer system to:
determine a user state of a user, wherein the user state comprises a comprehension level or a confusion level regarding how the user interacts with an interface of a particular application, wherein determining the user state is performed by identifying contexts for how the user interacts with the user interface, and wherein identifying the contexts includes identifying thresholds for the contexts and computed scores of the user for the contexts;

detect a plurality of different interface presentation formats associated with the particular application, wherein each different interface presentation format in the plurality of different interface presentation formats is configured to display content in at least one of a different format or a different sequence than used by another different interface presentation format in the plurality of different interface presentation formats, wherein:

a toggle button is provided on the user interface, the toggle button, when selected, causes the user interface to toggle from a current interface presentation format to a next interface presentation format from the plurality of different interface presentation formats based at least on the detected user state;

select an interface presentation format from among the plurality of different interface presentation formats based on the user state; and in response to a selection of a particular user interface command configured to cause the interface to revert from being displayed with the current interface presentation format to being displayed with a previous interface presentation format, adjust one or more of the identified thresholds in order to reduce a triggering sensitivity for determining when a subsequent interface presentation format change is to occur, such that the triggering sensitivity is reduced in direct response to the particular user interface command being selected.

15. The computer system of claim 14, wherein the contexts for how the user interacts with the user interface include a measured number of times the user looks away from the user interface.

16. The computer system of claim 14, wherein the contexts for how the user interacts with the user interface include a duration measured for each time the user looks away from the user interface.

17. The computer system of claim 14, wherein the contexts for how the user interacts with the user interface include a measured rate of eye movement of the user between different specific areas of the user interface.

* * * * *